(12) United States Patent
Hendry

(10) Patent No.: US 7,675,525 B2
(45) Date of Patent: Mar. 9, 2010

(54) DEEP PIXEL DISPLAY AND DATA FORMAT

(75) Inventor: Ian Hendry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/326,887

(22) Filed: Dec. 3, 2008

(65) Prior Publication Data

US 2009/0079751 A1  Mar. 26, 2009

Related U.S. Application Data

(63) Continuation of application No. 11/117,960, filed on Apr. 29, 2005, now Pat. No. 7,474,315.

(51) Int. Cl.
*G09G 5/00* (2006.01)
*G09G 5/02* (2006.01)
*G09G 5/36* (2006.01)
*G09G 5/10* (2006.01)
*G06K 9/40* (2006.01)
*G06K 9/36* (2006.01)
*H04N 5/46* (2006.01)

(52) U.S. Cl. ............... 345/589; 345/605; 345/581; 345/690; 345/549; 348/557; 348/560; 358/518; 382/274; 382/284

(58) Field of Classification Search ............... None
See application file for complete search history.

(56) References Cited

U.S. PATENT DOCUMENTS

| | | | | |
|---|---|---|---|---|
| 5,131,080 A | * | 7/1992 | Fredrickson et al. | 345/557 |
| 6,278,437 B1 | * | 8/2001 | Iga et al. | 345/598 |
| 2004/0021677 A1 | * | 2/2004 | Sasaki et al. | 345/694 |
| 2004/0233215 A1 | * | 11/2004 | Dawson | 345/592 |
| 2006/0012609 A1 | * | 1/2006 | Larson | 345/600 |

* cited by examiner

*Primary Examiner*—Wesner Sajous
(74) *Attorney, Agent, or Firm*—Williams, Morgan & Amerson, P.C.

(57) ABSTRACT

A method, graphics card, system, and data stream for generating a deep pixel display on a display device are provided. A first set of data relating to a region associated with a display is provided. The first set of data is processed to define a pixel definition. A second set of data relating to the first pixel is determined. At least one portion of the first set of data is rearranged to form at least a portion of the second set of data. A deep pixel is defined based upon the second set of data. The present invention also includes a system that includes a display controller that is adapted to define a deep pixel based upon rearranging the portion of the first set of data.

20 Claims, 7 Drawing Sheets

DEEP PIXEL DISPLAY AND DATA FORMAT

CROSS-REFERENCE TO RELATED APPLICATION

This is a continuation application of U.S. application Ser. No. 11/117,960 filed Apr. 29, 2005 now U.S. Pat. No. 7,474,315.

BACKGROUND OF THE INVENTION

1. Field of the Invention

This invention relates generally to a user interface for sharing content, and, more particularly, to a method, apparatus, and system for providing a deep pixel display on a display device.

2. Description of the Related Art

There are various types of displays, such as computer monitors, that are used to display data provided by a computer system or other devices. Often, a digital signal is sent to a display device for displaying various representations of data provided by the computer system. Often, a digital signal is provided by the computer system that may be decoded and used for generating an illustration on a display device. Displays are generally formed from a plurality of pixels, the creation of which is controlled by a computer system or an electronic device to provide various graphical illustrations on the display device. The signal provided by the computer system or an electronic device for the digital display often includes an encoded signal that contains data relating to the definition of various pixels associated with the digital display.

Commonly in the prior art, various signals that provide display data include a maximum of eight bits per color component for a definition of a pixel. There are often eight bits representing a red color signal, eight bits representing a blue color signal, and eight bits representing a green color signal. These bits are sent to the digital display to be deciphered for generating the definition and illustration of a particular pixel on the digital display. One problem associated with the state-of-the-art system includes the fact that the definition of each pixel is limited by eight bits of data per color component. This makes it difficult to efficiently send more detailed color information for the pixels to be displayed on the display devices.

Designers have employed various techniques in an attempt to deliver additional information for the definition of display pixels. However, state-of-the-art solutions are being met with various inefficiencies and problems. Designers have implemented various dithering signals in an attempt to provide greater definition for pixels of a digital display. Dithering methods, such as averaging or truncating various values representing various colors over a period of time have been employed. This time-averaging method has been used to arrive at a particular average color-value based upon the perception of the user's eye. This method relates to temporal dithering of a signal to approach greater definition of a pixel. For example, if a particular pixel has a color-value of five, but a slightly different color-value (e.g., a value between five and six) could provide for deeper definition of a pixel; then for a period of time, a color-value of five may be sent and for a smaller period of time, and a color-value of six may be sent. Therefore, over time, the user's eyes may perceive a slightly different value than the color-value five (e.g., a value between five and six). For example, the user's eyes may perceive a slightly brighter green color as compared to the green color defined by the color-value five. Another prior art technique includes using a dual-signal approach to provide deeper pixel definitions. Other techniques include a spatial dithering technique where an averaging function is performed over a certain amount of space to create a perception of deeper pixel definitions. However, problems associated with this method include limited increase in pixel depth; particularly since these methods only allow for the capability of adding the effective resolution of one to two bits more than the current standard. Further, maintaining a desired resolution for deep pixels is made difficult due to various complexities of performing temporal or spatial dithering. Therefore, there are limitations to the increased pixel definition that may be achieved using various dithering techniques. There is a desire in the industry to achieve greater pixel definition than currently allowed by the implementations provided by the current transmission standards.

The present invention is directed to overcoming or at least reducing one or more of the problems set forth above.

SUMMARY OF THE INVENTION

In one aspect of the present invention, a method is provided for generating a deep pixel display on a display device. The method of the present invention includes combining a first portion of a first set of data relating to a first pixel, with at least a portion of a second set of data relating to the first pixel to generate a deep pixel.

In another aspect of the present invention, a method is provided for generating a deep pixel display on a display device. A first set of data relating to a region of a display is received. The first set of data is then stored. A second set of data relating to the region is also received. At least a portion of the first set of data is combined with at least a portion of the second set of data. The region is then defined based upon combining the portion of the first and second sets of data.

In another aspect of the present invention, another method provided for generating a deep pixel display on a display device. A first set of data relating to a first set of pixels is received. The first set of data is then buffered. A second set of data relating to the first set of pixels is received. At least a portion of the first set of data is combined with at least a portion of the second set of data. A second set of pixels is defined based upon combining of the portion of the first and second sets of data. Defining the second set of pixels includes defining pixels comprising resolution larger than resolution of the first set of pixels.

In yet another aspect of the present invention, another method is provided for generating a deep pixel display on a display device. A first set of data relating to a first pixel is provided. The first set of data is stored. A second set of data relating to the first pixel is provided. At least one portion of the first set of data is combined with at least a portion of the second set of data. A deep pixel is defined based upon combining the portion of the first and second sets of data.

In yet another aspect of the present invention, a system is provided for generating a deep pixel display on a display device. The system of the present invention includes an electronic device adapted to provide a display signal. The display signal includes a first set of data and a second set of data relating to a first pixel. The system also includes a display controller communicatively coupled to the electronic device. The display controller is adapted to receive and store the first portion of data. The display controller is also adapted to receive the second set of data and combine a portion of the first set of data with a portion of the second set of data to generate a deep pixel. The system also includes a display device that is operatively coupled with the display controller. The display device is adapted to display the deep pixel.

In yet another aspect of the present invention, an apparatus is provided for generating a deep pixel display on a display device. The apparatus of the present invention includes a display controller that is adapted to receive a first set of data and a second set of data relating to a first pixel. The display controller is adapted to receive and store the first portion of data. The display controller is also adapted to receive the second set of data and combine a portion of the first set of data with a portion of the second set of data to generate a deep pixel.

In yet another aspect of the present invention, a computer readable program storage device encoded with instructions is provided for generating a deep pixel display on a display device. The computer readable program storage device encoded with instructions that, when executed by a computer, performs a method, which includes receiving a first set of data relating to a first set of pixels; buffering the first set of data; receiving a second set of data relating to the first set of pixels; combining at least a portion of the first set of data with at least a portion of the second set of data; and defining a second set of pixels based upon combining of the at least portion of the first and second sets of data. Defining the second set of pixels includes defining pixels comprising a resolution larger than resolution of the first set of pixels.

In yet another aspect of the present invention, a graphics card is provided for generating a deep pixel display on a display device. The graphics card of the present invention includes a display controller. The display controller is adapted to receive a first set of data and a second set of data relating to a first pixel. The display controller is also adapted to receive and store the first portion of data. The display controller is also adapted to receive the second set of data and combine a portion of the first set of data with a portion of the second set of data to generate a deep pixel.

In another aspect of the present invention, a method is provided for generating a deep pixel display on a display device. A first set of data relating to a region associated with a display is received. The first set of data processed for defining a pixel definition. Processing the data includes rearranging at least one bit from the first set of data to provide an enhanced definition of at least one component of the pixel definition to provide a second set of data.

In another aspect of the present invention, a graphics card is provided for generating a deep pixel display on a display device. The graphics card of the present invention includes a data interface for receiving a first set of data. The graphics card of the present invention also includes a display controller. The display controller is adapted to process the first set of data for defining a pixel definition. The display controller is also adapted to rearrange at least one bit from the first set of data to provide an enhanced definition of at least one component of the pixel definition.

In yet another aspect of the present invention, a system is provided for generating a deep pixel display on a display device. The system of the present invention includes an electronic device adapted to provide a display signal. The display signal includes a first set of data and a second set of data relating to a first pixel. The system also includes a display controller communicatively coupled to the electronic device. The display controller is adapted to process the first set of data for defining a pixel definition. The display controller is also adapted to rearrange at least one bit from the first set of data to provide an enhanced definition of at least one component of the pixel definition to provide an enhanced pixel. The system also includes a display device operatively coupled with the display controller. The display device is adapted to display the enhanced pixel.

In another aspect of the present invention, a method is provided for generating a deep pixel display on a display device. At least a portion of a first set of data relating to a first pixel is combined with at least a portion of a second set of data relating to the first pixel. A deep pixel is defined based upon combining the portion of the first and second sets of data.

In yet another aspect of the present invention, a data stream is provided for generating a deep pixel display on a display device, wherein the data stream is transmitted over a transmission medium. The data stream of the present invention includes a first set of data relating to a first pixel and a second set of data relating to the first pixel. The first set of data and the second set of data may be combined to generate a deep pixel.

In yet another aspect of the present invention, a data stream is provided for generating a deep pixel display on a display device, wherein the data stream is transmitted over a transmission medium. The data stream of the present invention includes a first set of data relating to a first pixel. At least one bit from the first set of data is rearranged to provide an enhanced definition of at least one component of the first pixel definition by providing a second set of data for a deep pixel on the data stream.

In yet another aspect of the present invention, a computer readable program storage device encoded with instructions is provided for generating a deep pixel display on a display device. The computer readable program storage device encoded with instructions that, when executed by a computer, performs a method for forming a deep pixel. The method includes combining at least a portion of a first set of data relating to a first pixel with at least a portion of a second set of data relating to the first pixel. The method also includes defining the deep pixel based upon combining the portion of the first and second sets of data.

In yet another aspect of the present invention, a deep pixel is provided for generating a display on a display device. The deep pixel of the present invention may be formed by combining a first set of data relating to a first pixel, with a second set of data relating to the first pixel. The deep pixel is capable of being displayed on a display device.

BRIEF DESCRIPTION OF THE DRAWINGS

The invention may be understood by reference to the following description taken in conjunction with the accompanying drawings, in which like reference numerals identify like elements, and in which.

Figure 1:
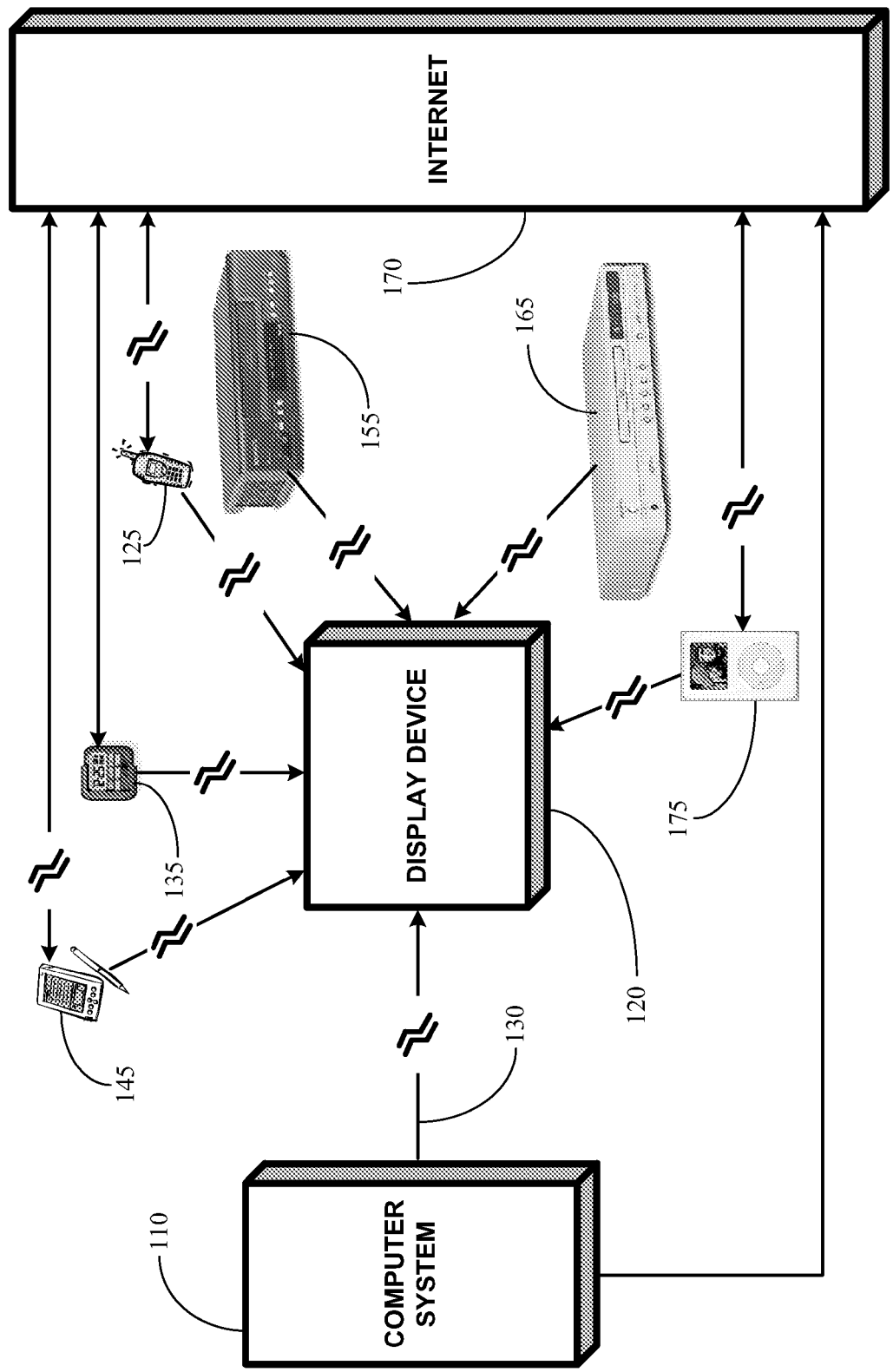
FIG. 1 illustrates various devices capable of providing a display for a display device, in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for a deep pixel display based upon a plurality of sets of pixel data for a digital display. Embodiments of the present invention may be used to develop a deep pixel display by combining multiple data sets relating to a particular pixel. A first set of data relating to one or more pixel(s) may be transmitted and buffered. Subsequently, a second set of data relating to the same pixel(s) may also be transmitted. Various combinations of portions of the first set of data and portions of the second set of data may be combined to define a deeper pixel display. Therefore, more defined pixel(s) with higher resolution or other characteristics, such as a deeper color, etc., may be provided. The term "deep pixel" may refer to a variety of display enhancements, such as colors with greater definition, brighter colors, darker colors, sharper images, additional data relating to an image that may be displayed in a variety of manners, etc. Embodiments of the present invention may be implemented into data transmission standards (e.g., low-voltage differential signaling [LVDS] and transition minimized differential signaling [TMDS]) without substantially modifying the transmission standards.

Turning now to FIG. 1, a block diagram depiction of a computer system and various devices in communication with a display device, in accordance with embodiments of the present invention is illustrated. A computer system 110 may provide display data on a communication line 130 to a display device 120. For ease of description and for clarity, the display data is described as being provided by a computer system 110, however, display data may be provided by any electronic device, such as a personal digital assistant (PDA) 145, a cellular telephone 125, a pager 135, a video cassette recorder (VCR) 155, a digital disc player (e.g., a compact disk [CD] or a digital video disk [DVD]) 165, a digital data player 175 (e.g., an iPOD® device offered by Apple Computers®), or the like, which may be communicatively coupled to the display device 120. The computer system 110 may be desktop computers or servers, such as an Apple Macintosh®, a classic Apple Mac®, a Power Mac G4®, a Power Mac G5, an iMac®, an IBM compatible personal computer (PC), and the like. The computer system 110 and/or the other electronic devices (125, 135, 145, 155, 165, 175) may communicate with the display device 120 via a variety of communication lines or transmission mediums, such as a hard-wire line, an Ethernet line, a wireless line, and/or the like.

In one embodiment, the display device 120 is a digital display device, which is capable of receiving data and providing a digital display of various images and data-screens as prescribed by the computer system 110 and/or the electronic devices of FIG. 1. The display device 120 may comprise a plurality of display regions or pixels, as described in greater detail below. These pixels may be defined by the display data provided on the communication line 130 (e.g., LVDS or TMDS communications line). The communication line 130 may represent a variety of communication infrastructure, such as wired communication, wireless communications, and the like. The communication line 130 may represent connections to an intranet or the Internet 170. The communication line 130 may represent smaller sub-LAN, with the sub-LAN being coupled to the Internet 170.

Embodiments of the present invention provide for the computer system 110 to provide a multiple set of pixel data to the display device 120 wherein various portions of respective data sets may be combined to provide a deep pixel display on the display device 120. The display device 120 may be a CRT monitor, flat panel monitor, a liquid crystal display (LCD) monitor, or any type of device capable of displaying electronic signal representations.

Figure 2:
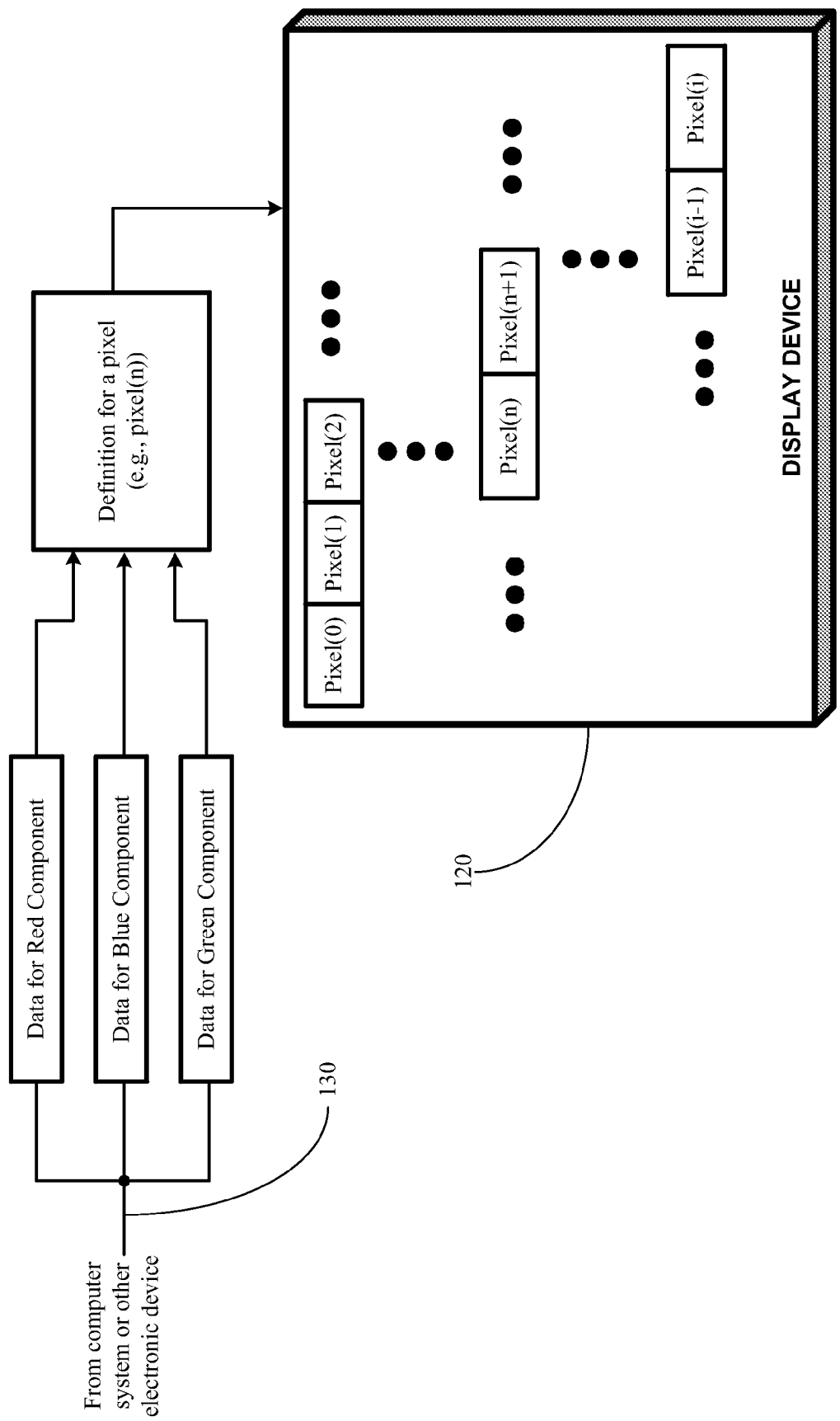
FIG. 2 illustrates a block diagram depiction of a data flow to the display device of FIG. 1, in accordance with one illustrative embodiment of the present invention.

Turning now to FIG. 2, a block diagram depiction of a display device 120 is illustrated. A communication line 130 may be capable of carrying serial digital data. As depicted in FIG. 2, the communication line 130 from the computer system 110, or various other devices illustrated in FIG. 1, may carry data representing various components of color spaces, such as data for a red component 205, data for a blue component 210, and data for a green component 215. Those skilled in the art having benefit of the present disclosure would appreciate that embodiments of the present invention may be implemented using other color space data components. These data components may be used to provide a definition for a particular pixel, such as pixel(n). The display device 120 may comprise various regions or pixels, such as a pixel(0), a pixel (1), a pixel(2), . . . a pixel(n), a pixel(n+1), . . . a pixel(i−1), and a pixel(i). Various data sets provided on the communication line 130 may be combined in such a fashion that it would provide a definition of each of the pixels, e.g., pixel(n), to be displayed on the display device 120.

Embodiments of the present invention provide for combining various portions of the data on the communication line 130 to provide a deep pixel display definition as compared to the standard 8-bit pixel definition for each color component (e.g., LVDS or TMDS standards). Therefore, utilizing embodiments of the present invention, each of the pixels, i.e., pixel(0) through pixel(i), are displayed with more resolution and/or more defined characteristics, such as deeper color representation, and the like.

Figure 3:
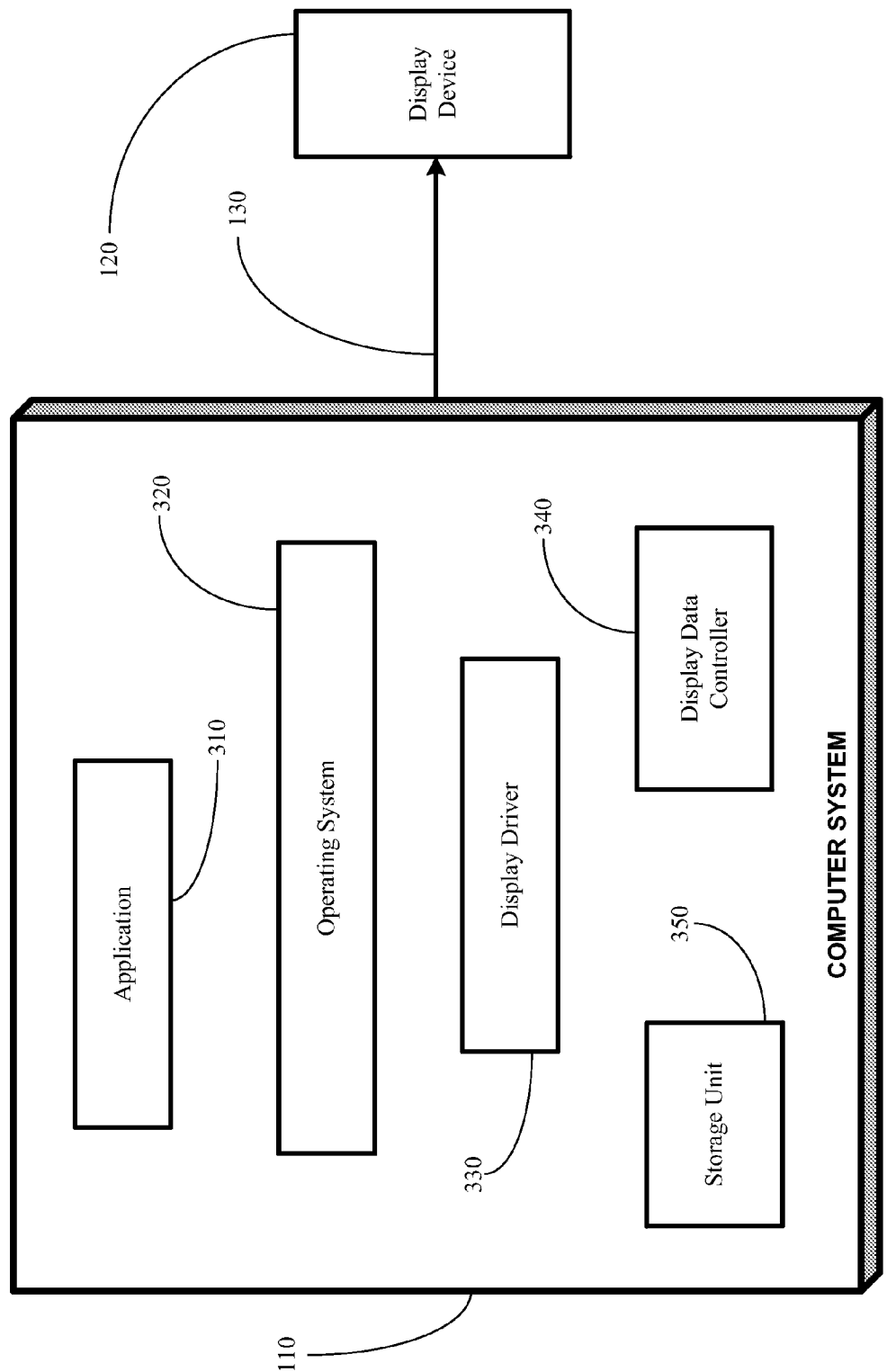
FIG. 3 illustrates a more detailed block diagram illustration of a computer system of FIG. 1, in accordance with one illustrative embodiment of the present invention.

Turning now to FIG. 3, a block diagram depiction of the computer system 110 in accordance with one embodiment of the present invention is illustrated. The computer system 110 may comprise one or more applications 310, an operating system 320, a display driver 330, a storage unit 350, and a display data controller 340. The storage unit 350 may comprise a variety of memory devices. The storage unit 350 may be a magnetic disk memory, a solid state memory device, such as Flash memory, a RAM memory, DRAM memory, one or more registers for creating memory, and/or any other type of memory. The operating system 320 is capable of controlling the various operations performed by the computer system 110. The operating system 320 comprises various interfaces that are capable of respectively interfacing with the various applications, such as the application 310. The application 310 may be one of a variety of applications, such as iPhoto™, iChat™, various data manipulation applications, and the like.

The display data controller 340 may be a software unit, a hardware unit, a firmware unit, or any combination thereof. The display data controller 340 may comprise, or may be a part of, a graphics card. The display data controller 340 is capable of generating, controlling and/or providing data for pixel definition for displaying images on the display device 120. The display driver 330 is capable of sending appropriate data prescribed by the display data controller 340 to the display device 120. The display data controller 340 provides for higher resolution and/or deeper pixel descriptions by providing multiple sets of data that may be combined to generate a deep pixel definition for a particular pixel to be displayed on the display device 120.

In one embodiment, the display data controller 340 may store a first set of pixel definition data in the storage unit 350 to buffer the first set of data relating to a pixel, or relating to a group of pixels. The display data controller 340 may also generate or receive data relating to a second set of pixel definitions, wherein at least a portion of the first set of data and at least a portion of the second set of data may be combined to provide a deeper pixel definition to be displayed on the display device 120. The display data controller 340 is capable of determining or deciphering whether it is operating in a normal mode, where normal pixels are displayed, or whether it is operating in a deep pixel mode, where it generates deep pixels for the display device 120. In one embodiment, the buffering of the first set of data as well as the process of combining the first and second sets of data may be performed by computer system 110. However, other embodiments may call for the combining function and the buffering function to take place within the display device 120, while remaining within the scope and spirit of the present invention. One of the advantages provided by embodiments of the present invention includes being able to use a partial line buffer, which may be readily available as part of various existing standards (e.g., LVDS and TMDS standards). This is true since a low order set of bit and a high order set of bits (i.e., the first portion and the second portion) are sent on a line, wherein the buffer is only required to store the lower order bits, which are combined with the higher order bits when they are received. Further details regarding combining portions of the first and the second set of pixel data is provided in subsequent Figures and accompanying description below.

Embodiments of the present invention provide for collecting or extracting data from a signal, e.g., a display signal provided by the computer system 110, and buffering or storing portions of the signal relating to a particular pixel until a subsequent set of bits for that particular pixel is received. This process may be performed in parallel for a plurality of pixels. Subsequently, extraction of bits from the initially received buffered data relating to a particular pixel, and the subsequently received data relating to that particular pixel, may be combined in one of a plurality of manners such that more defined, deeper, and/or higher resolution pixels may be generated for displaying on the display device 120. A variety of algorithms may be used to combine the respective data sets relating to a particular pixel.

Figure 4:
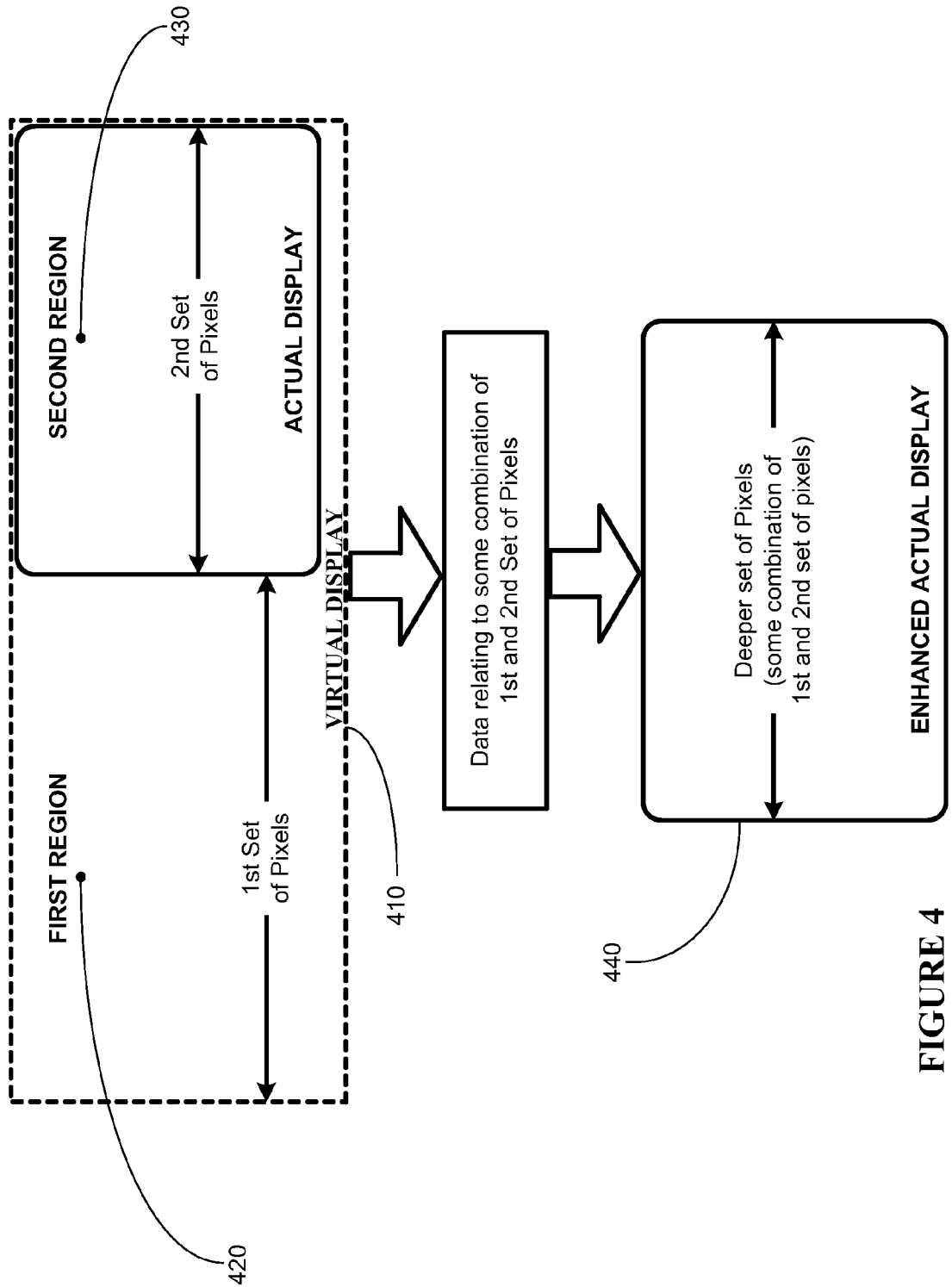
FIG. 4 illustrates a stylized block diagram representation of a virtual display and an actual display, in accordance with one illustrative embodiment of the present invention.

Those skilled in the art having benefit of the present disclosure may use a variety of methods to combine data relating to the initially and subsequently received sets of bits, and remain within the spirit and scope of the present invention. As an example, for illustrative purposes, the first set of data may comprise eight bits of data defining a particular pixel, wherein the second set of data received may also comprise eight bits, but only four bits from the second set may be used to combine with the initially received 8-bit set of data to generate a deeper pixel. The deeper pixel is defined by 12 bits of data. For example, a particular pixel may be defined by the initially received eight bits that are buffered. Subsequently, a second set of data relating to that particular pixel is received, wherein four bits from the second set of data are extracted. The initially received eight bits and the four most significant bits from the subsequently received data set may be combined to provide a pixel defined by twelve bits of data, resulting in a deeper pixel definition. This allows for deeper pixel definition and more robust and more accurate depiction of the desired display on the display device 120. Therefore, the display data controller 340 will buffer or store the initial set of bits defining a particular pixel and when rendering the particular pixel on a display device 120, the second set of data is combined with the first set to provide for a more detailed, deeper pixel definition. Those skilled in the art having benefit of the present disclosure would realize that a variety of sizes of buffers may be used to accommodate various bit sizes for definition of a pixel, such as a 10-bit display definition, 12-bit display definition, a 14-bit definition, or the like. FIG. 4 illustrates a block diagram to provide a visual depiction of one implementation of one embodiment of the present invention.

FIG. 4 illustrates a virtual display 410 that comprises two sets or regions: a first region 420 defined by a first set of pixels and a second region 430 defined by a second set of pixels, wherein the second region 430 relates to an actual display that is displayed on a display device 120. The term "virtual display" may refer to a display region generated by the computer system 110 for example, where some portions of virtual display may not be displayed on the display device 120 until further processing. The term "actual display" may refer to the display region that is actually displayed on the display device 120, wherein the "actual display" may comprise a modified or an unmodified portion of the "virtual display". The virtual display may be a display representation that may be provided by software, and may be generated by the display data controller 340 in order to control a display or video card. The video card may be encompassed into the display data controller 340. From the point of view of the display data controller 340, in order to display a particular set of data provided by the computer system 110, a virtual display 410 may be created where the actual display area defined by the second region 430 may be a smaller display region of the virtual display 410, such as a 124 pixels wide region. The data display controller 340 may then add another set of pixels, such as a 512 pixel wide region that would be "virtually" drawn by the display data controller 340.

In one embodiment, the lower order bits defining a particular pixel may be first drawn into the first region 420, which may be a stored memory or buffer. Then, as the second set of data defining the second set of pixels for the second region 430 is received, the data defining the first set of pixels for the first region and the data relating to the second set of pixels relating to the second region 430 are then combined to provide a new set of data that comprises deep pixel definitions. These deep pixel definitions would be used to generate deep pixels that would actually be displayed on an enhanced actual display 440, as illustrated in FIG. 4. Therefore, the display that is provided on the display device 120 may be of a deeper set of pixels, which is a combination of the first set of pixels and the second set of pixels. Therefore, the actual display 440 may be a combination of at least a portion of the virtual display that is modified. The deeper set of pixels provides for more details with greater resolution, since the pixels have a deeper definition. Those skilled in the art having benefit of the present disclosure may combine data relating to the first set of pixels 420 and the second set of pixels 430 in a variety of fashions, wherein the first region and the second region may be defined in different dimensions and still remain within the spirit and scope of the present invention. Additionally, a user may be allowed to control how the first and the second set of pixels are combined to achieve various levels of resolution or depth of pixels. In other words, extraction of data defining the first region 420 and data defining the second region 430, may be combined in a number of various fashions to generate the enhanced actual display 440, which may be of various resolutions.

Figure 5:
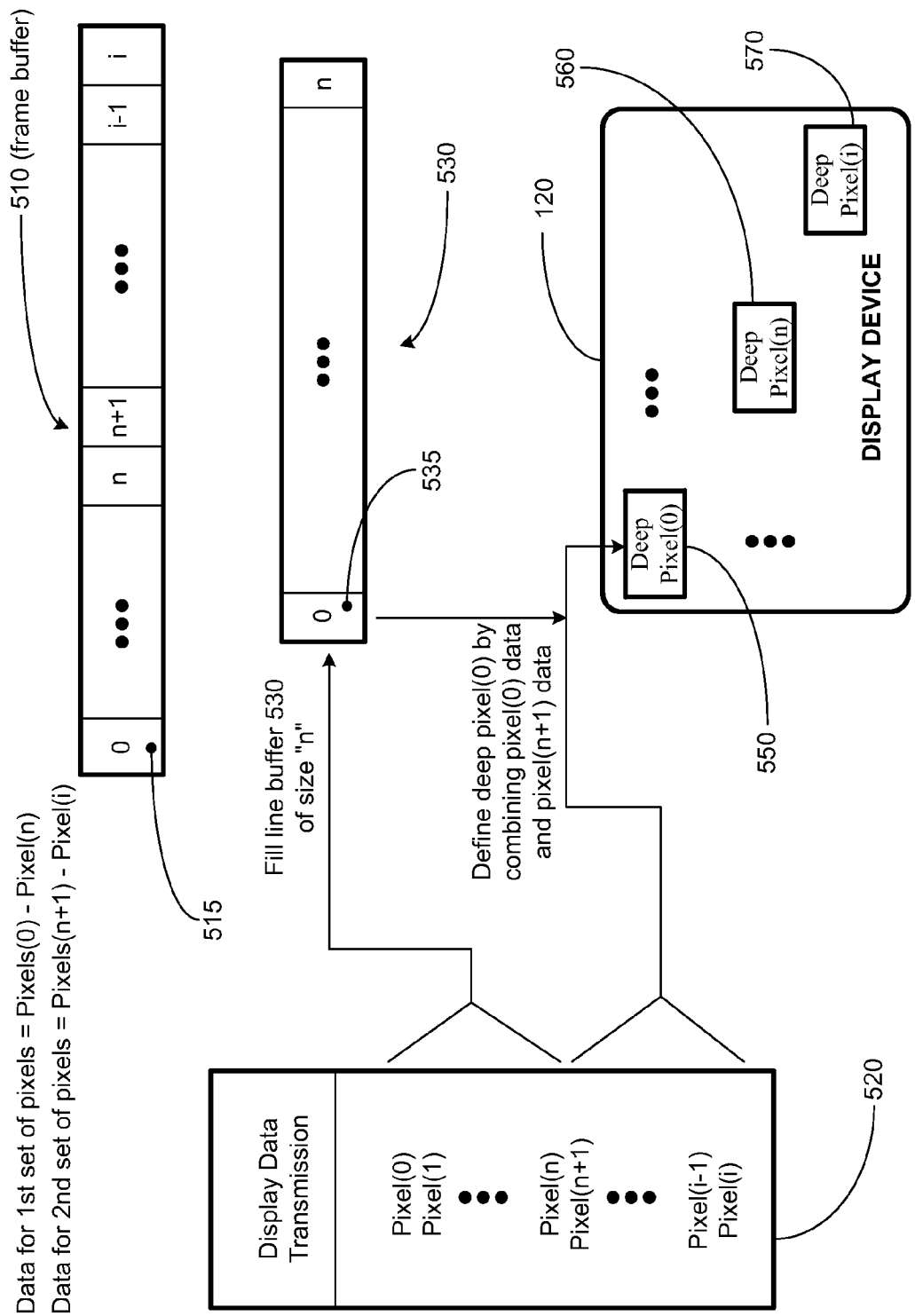
FIG. 5 illustrates a stylized block diagram representation of a frame buffer and data flow for the display device of FIG. 1, in accordance with one illustrative embodiment of the present invention.

Turning now to FIG. 5, an exemplary block diagram illustrating the acquisition and combination of various pixel sets is provided. A display device 120 as illustrated in FIG. 2, may comprise various pixels, such as pixel(0) . . . pixel(n), pixel (n+1) . . . pixel(i−1), and pixel(i). For illustrative purposes, data relating to the first set of pixels may be defined by data corresponding to pixel(0) through pixel(n). Data relating to a second set of pixels may relate to pixel(n+1) through pixel(i). A frame buffer 510 illustrated in FIG. 5 may be capable of storing the pixel data relating to pixel(0) through pixel(n) in one portion and data relating to pixel(n+1) through pixel(i) in another portion. Each one of the pixel regions, such as the pixel(0) region 515 may be defined by one or more bits of data, defining that particular pixel. In one embodiment, the term "region" may encompass a variety of space on a display, such as a line; however, this term may refer to any sub-section of a display or screen, including the entire display. The frame buffer 510 may comprise various registers and memory storage devices that may operate in a variety of manners. For example, the frame buffer 510 may operate in a first-in-first-out (FIFO) manner where data is serially registered in and out. In another embodiment, the data relating to pixel definition may be registered in and out in a parallel fashion.

In one embodiment, a block 520 representing a data display transmission may transmit data in a linear fashion where data relating to pixel(0) data is followed by pixel(1) data, followed by various pixels, such as pixel(n) data, and pixel(n+1) data through pixel(i) data. In one embodiment, the display data controller 340 may buffer the data relating to pixel(0) to pixel(n) into a buffer, as illustrated by a buffer 530. Once the data relating to pixel(0) through pixel(n) are buffered, the next set of pixels (i.e., pixel(n+1) to pixel(i)) may be received for display on the display device 120. During reception of data relating to the pixel(n+1) through pixel(i), various pixels from each data set may be combined. However, the data relating to the pixels may be combined at any point. For example, pixel(0) may be combined from a buffer portion 535 in the buffer 530, with pixel(n+1) in order to generate a new deep pixel(0) 550, which is displayed on the display device 120. In a similar fashion, other deep pixels on the display device 120 (e.g., deep pixel(n) 560, deep pixel(i) 570) may be generated and displayed using various combinations of the first and second set of pixel data. The illustration provided in FIG. 5 is for exemplary illustrative purposes. Those skilled in the art having benefit of the present disclosure would be able to utilize a variety of buffering schemes and algorithms to combine various sets of pixel data to display a deep pixel display on the display device 120, and yet remaining within the spirit and scope of the present invention.

Figure 6:
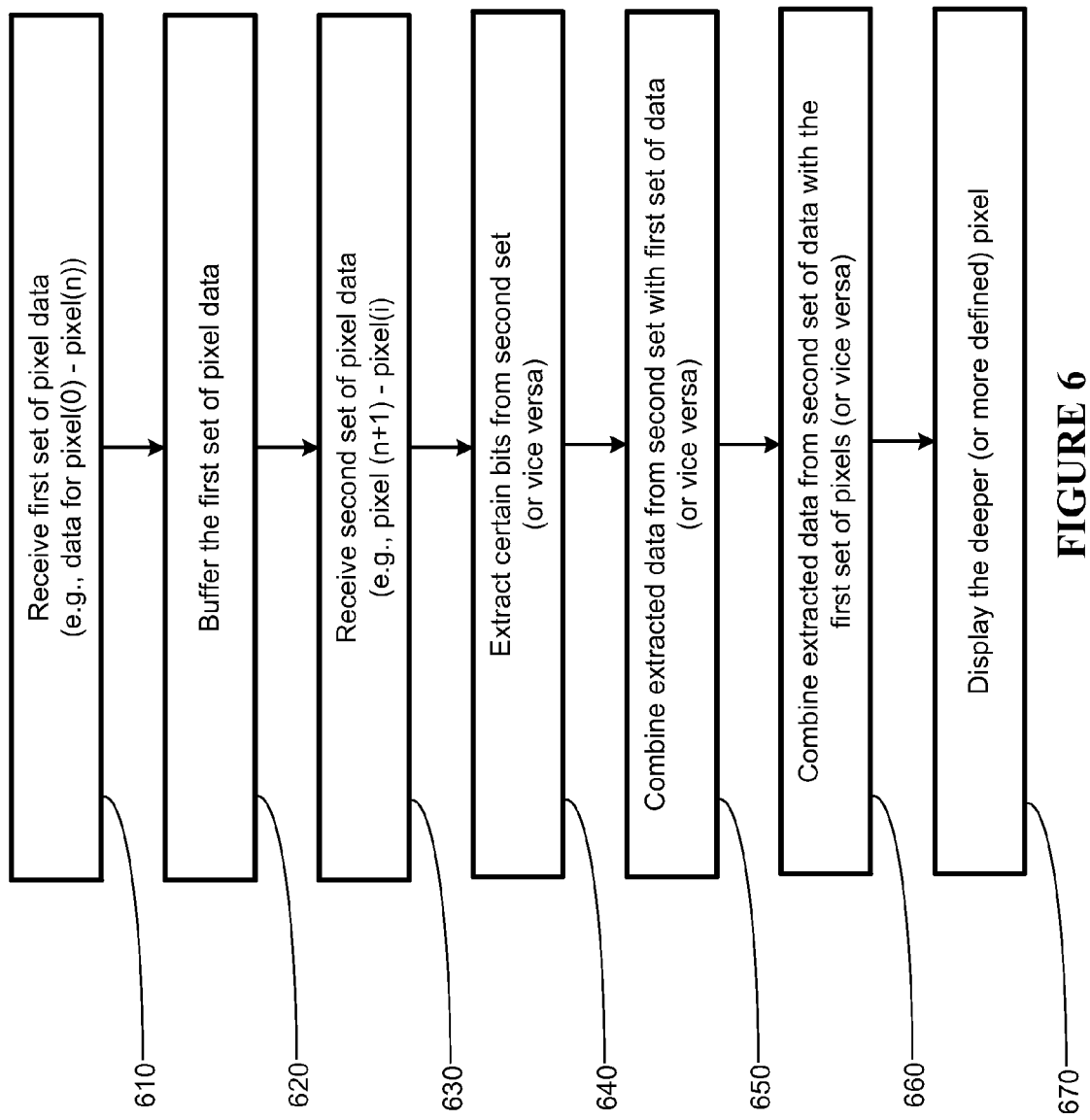
FIG. 6 illustrates a flowchart representation of a method in accordance with one illustrative embodiment of the present invention.

Turning now to FIG. 6, a flowchart depiction of embodiments of a method in accordance with embodiments of the present invention is illustrated. The display data controller 340 may receive a first set of pixel data to be displayed on a display device 120 (block 610). For example, the data relating to the first set of pixel data may comprise data relating to pixel(0) through pixel(n). The display data controller 340 may then buffer or store the first set of pixel data (block 620). In one embodiment, the first set of pixel data may be stored in a FIFO register/buffer or in any type of memory. The data display controller 340 may then receive, generate, or acquire a second set of pixel data for display on the display device 120 (block 630). The second set of pixel data, for example, may include data relating to pixel(n+1) to pixel(i). In one embodiment, the transmission of the first set of data and the second set of data may be performed within the allowed bandwidth for transmitting the standard 8-bit data for pixel definition. In other words, the transmission of the second set of data for providing additional definition for a pixel may be performed within the standard data transmission provided for display data. Implementation of embodiments of the present invention may require utilization of additional portions of the available bandwidth reserved for display data, however, the additional display data for the pixel may be transmitted within the standard display data transmission protocol.

In one embodiment, subsequent to the receiving or acquiring the second set of pixel data, the display data controller 340 may extract, generate, or receive certain bits from the second set of pixel data (block 640). In an alternative embodiment, this process may be performed vice versa, i.e., extracting certain bits from the first set of pixel data. Upon extraction of bits from the second set of pixel data, in one embodiment, the display data controller 340 may then combine the extracted data from the second set of pixel data with the first set of pixel data (block 650). Conversely, in an alternative embodiment, upon extraction of certain bits from the first set of pixel data, the display data controller 340 may combine the extracted data from the first set of pixel data with the second set of pixel data. The combining of the data described in block 650 may be based upon a variety of algorithms for combining data, such as increasing the resolution of the display data by using certain data bits as the least significant bits and other data bits as the more significant bits. Upon combining of the data sets, the display data controller 340 defines a deeper pixel display with increased bit resolution based upon the combination (block 660). This deeper pixel display is then displayed on the display device 120 (block 670).

Figure 7:
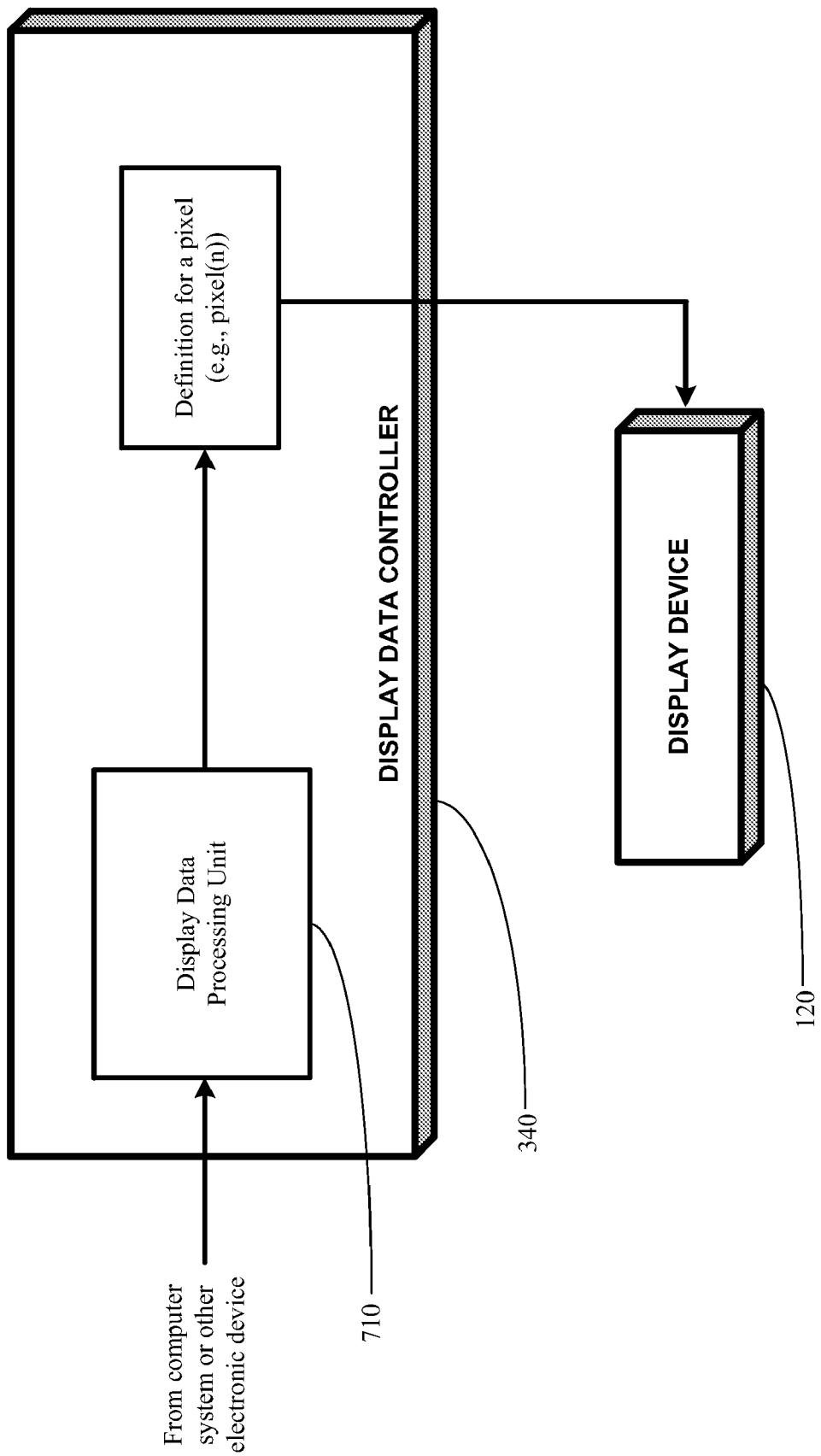
FIG. 7 illustrates a block diagram representation of a display data controller of the computer system of FIG. 3, in accordance with one an alternative embodiment of the present invention.

Turning now to FIG. 7, a display data controller 340 in accordance with an alternative embodiment of the present invention is illustrated. The display data controller 340 may comprise a display data processing unit 710 that is capable of processing a stream of data received from a computer system or other electronic device. The display data processing unit 710 is capable of providing data relating to a definition for a pixel, such as pixel (n). Data from the display data controller 340 is sent to a display device 120 for displaying the particular pixels. The display data processing unit 710 may comprise various processors, registers, decoders, etc., for clocking in, processing, and/or reordering received streams of data from a computer system or an electronic device. The display data processing unit 710 is capable of reassembling the received data streams to provide a data set that carries enhanced definitions of particular color components of a pixel.

The display data controller 340, in one embodiment, is capable of receiving an alternative format of data that may be reassembled into a deeper pixel data definition. The received data stream may be in a serial data format, and in an alternative embodiment, the data stream may be in a parallel format. The data stream may contain information for enhancing a component of a pixel (e.g., deeper color definition of the pixel). For example, as compared to a traditional, exemplary serial data stream, such as a data stream representing a nibble or a half-byte representing a red color component data portion (R), a nibble or a half-byte representing a green color component data portion (G), and a nibble or a half-byte representing a blue color component data portion (B), which may be represented by the format:

RRGGBB RRGGBB RRGGBB;

which is an exemplary data stream sent to define a particular pixel, a deeper definition of red, green and/or blue color component data may be sent. Therefore, a serial data stream that contains additional information to provide a deeper or enhanced definition of a pixel may be received by the display data controller 340, and may be represented by the format:

RR RR GG GG BB BB RR RR GG GG BB BB RR RR GG GG BB BB;

where RR RR represents a deeper red pixel definition, GG GG represents a deeper green pixel definition, and BB BB represents a deeper blue pixel definition. The display data controller 340 may reassemble this data as:

RRRRGGGGBBBB RRRRGGGGBBBB RRRRGGGG-BBBB, in order to define a set of pixels with deeper or greater resolution. Since the reassembled bits may be used to directly display a deeper or higher resolution pixel substantially immediately, the need for buffering various pixels is substantially reduced.

As another example, a 12-bit data value (3 nibbles) serial data stream represented as:

RR RG GG BB BR RR GG GB BB RR RG GG BB BR RR GG GB BB, may be received by the data display processing unit 710. The display data controller 340 may then process and/or decode the data string. The decoded data string may be reassembled into data sets (e.g., bytes, words, etc) representing deep pixels to be displayed on the display device 120. The reassembled portion of the 12-bit values may form the following sequence:

RRRGGGBBB   RRRGGGBBB   RRRGGGBBB RRRGGGBBB;

therefore, these 12-bit data sets may be used to define pixels of greater or deeper resolution.

Utilizing the deeper data string that carries the deeper pixel definitions, more detailed pixels that are deeper or higher in resolution of color components may be displayed on the display device 120. In instances where a display device 120 is not capable of displaying deeper or higher resolution pixels, the display device 120 may truncate or ignore various portions of the display data and simply display pixels of normal definition. Display devices 120 capable of displaying higher resolution or deeper pixels may utilize the processed display data in a variety of manners to display enhanced pixels.

The methods provided herein may be performed in conjunction with single-link displays, dual-link displays, or any number of types of displays. For implementation of embodiments of the present invention in conjunction with dual-link displays, increased usage of bandwidth may result. Utilizing embodiments of the present invention by combining various bit sets may be used to provide pixel displays with greater resolution and deeper color definitions. Embodiments of the present invention may be utilized to provide displays for a variety of applications, such as computer system applications, advertisement display applications, and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising
   receiving, at a device, a first set of data relating to a region associated with a display; and
   processing said first set of data for defining a pixel definition, processing said data comprising moving a relative position at least one bit within said first set of data to provide an enhanced definition of at least one component of said pixel definition to provide a second set of data, wherein the first set of data and the second set of data are of different formats.

2. The method of claim 1, wherein receiving said first set of data further comprises receiving a data string represented by a first format of RR RG GG BB BR RR GG GB BB RR RG GG BB BR RR GG GB BB.

3. The method of claim 2, wherein processing said first set of data further comprises reassembling said first set of data into said second set of data represented by a second format of RRRGGGBBB RRRGGGBBB RRRGGGBBB RRRGGG-BBB, wherein said second format provides an enhanced definition of a pixel.

4. A graphics card for providing display data for a display device, comprising:
   a data interface for receiving a first set of data; and
   a display controller to process said first set of data for defining a pixel definition; said display controller adapted to move a relative position at least one bit within said first set of data to provide an enhanced definition of at least one component of said pixel definition.

5. A system, comprising:
   an electronic device adapted to provide a display signal, said display signal comprising a first set of data;
   a display controller to process said first set of data for defining a pixel definition; said display controller adapted to move a relative position at least one bit within said first set of data to provide an enhanced definition of at least one component of said pixel definition to provide an enhanced pixel; and
   a display device operatively coupled with said display controller, said display device to display said enhanced pixel.

6. The system of claim 5, wherein said electronic device may be at least one of a computer, a personal digital assistant, a cellular telephone, a pager, a video cassette recorder, a digital disc player, and a digital data player.

7. A data stream transmitted over a transmission medium, comprising:
   a first set of data relating to a first pixel, wherein a relative position at least one bit from said first set of data is moved to provide an enhanced definition of at least one component of said first pixel definition by providing a second set of data for a deep pixel on said data stream, wherein the first set of data and the second set of data are different formats.

8. The data stream of claim 7, wherein said first set of data further comprises a data string represented by a first format of RR RG GG BB BR RR GG GB BB RR RG GG BB BR RR GG GB BB.

9. The data stream of claim 8, wherein said second set of data further comprises a data string represented by a second format of RRRGGGBBB RRRGGGBBB RRRGGGBBB RRRGGGBBB.

10. The graphics card of claim 4, wherein receiving said first set of data further comprises receiving a data string represented by a first format of RR RG GG BB BR RR GG GB BB RR RG GG BB BR RR GG GB BB.

11. The graphics card of claim 10, wherein rearranging at least one bit from said first set of data comprises providing a second set of data.

12. The graphics card of claim 11, wherein the second set of data is represented by a second format of RRRGGGBBB RRRGGGBBB RRRGGGBBB RRRGGGBBB.

13. An article comprising a computer readable storage medium storing instructions that, when executed, cause a processor to perform a method of:
receiving a first set of data relating to a region associated with a display; and
processing said first set of data for defining a pixel definition, processing said data comprising moving a relative position at least one bit within said first set of data to provide a enhanced definition of at least one component of said pixel definition to provide a second set of data, wherein the first set of data and the second set of data are of different formats.

14. An article, as set forth in claim 13, comprising a medium storing instructions that, when executed, perform a method further comprising receiving a data string represented by a first format of RR RG GG BB BR RR GG GB BB RR RG GG BB BR RR GG GB BB.

15. An article, as set forth in claim 14, comprising a medium storing instructions that, when executed, perform a method further comprising reassembling said first set of data into said second set of data represented by a second format of RRRGGGBBB RRRGGGBBB RRRGGGBBB RRRGGGBBB, wherein said second format provides an enhanced definition of a pixel.

16. The method of claim 1, wherein rearranging at least one bit from said first set of data to provide a enhanced definition of at least one component of said pixel definition further comprises providing an enhanced definition that has at least one characteristic from the group selected from a deeper color definition and a sharper image, as compared to the characteristic of said first pixel definition.

17. The method of claim 1, further comprises receiving said first set of data within a bandwidth constraint relating to receiving data for displaying said region of said display.

18. The system of claim 5, wherein said enhanced pixel comprising at least one of a modified resolution, a modified color definition, or a modified image sharpness.

19. A computer readable program storage device encoded with instructions that, when executed by a computer, performs a method, comprising:
receiving a first set of data relating to a first pixel, said first pixel comprising at least one component from the group selected from a first resolution, a first color definition, and a first image sharpness;
removing a relative position at least one bit within said first set of data to provide a enhanced definition of at least one component of said first pixel definition to provide a second set of data, wherein the first set of data and the second set of data are different formats; and
defining a second pixel based upon said second set of data, said second pixel comprising at least one of a second resolution, a second color definition, or a second image sharpness.

20. The computer readable program storage device encoded with instructions that, when executed by a computer, performs the method of claim 19, wherein said first set of data comprises a first data string represented by a first format of RR RG GG BB BR RR GG GB BB RR RG GG BB BR RR GG GB BB, and wherein said second pixel is defined by a second data string reassembled from said first data string, wherein said second data string is represented by a second format of RRRGGGBBB RRRGGGBBB RRRGGGBBB RRRGGGBBB, wherein said second format provides at least one of said second resolution, said second color definition, or said second image sharpness of said second pixel.

* * * * *

UNITED STATES PATENT AND TRADEMARK OFFICE
CERTIFICATE OF CORRECTION

| | | |
|---|---|---|
| PATENT NO. | : 7,675,525 B2 | Page 1 of 1 |
| APPLICATION NO. | : 12/326887 | |
| DATED | : March 9, 2010 | |
| INVENTOR(S) | : Ian Hendry | |

It is certified that error appears in the above-identified patent and that said Letters Patent is hereby corrected as shown below:

In column 12, line 19, in Claim 1, delete "position" and insert -- position of --, therefor.

In column 12, line 39, in Claim 4, delete "position" and insert -- position of --, therefor.

In column 12, line 48, in Claim 5, delete "position" and insert -- position of --, therefor.

In column 12, line 62, in Claim 7, delete "position" and insert -- position of --, therefor.

In column 12, line 66, in Claim 7, delete "are" and insert -- are of --, therefor.

In column 13, line 26, in Claim 13, delete "position" and insert -- position of --, therefor.

In column 14, line 21, in Claim 19, delete "removing" and insert -- moving --, therefor.

In column 14, line 21, in Claim 19, delete "position" and insert -- position of --, therefor.

In column 14, line 25, in Claim 19, delete "are" and insert -- are of --, therefor.

Signed and Sealed this
Fifteenth Day of November, 2011

David J. Kappos
*Director of the United States Patent and Trademark Office*